United States Patent
Ronkainen et al.

(10) Patent No.: US 7,103,841 B2
(45) Date of Patent: Sep. 5, 2006

(54) METHOD AND ARRANGEMENT FOR PROVIDING AN EXPANDED DESKTOP

(75) Inventors: Sami Ronkainen, Oulu (FI); Sami Paihonen, Oulu (FI)

(73) Assignee: Nokia Corporation, Espoo (FI)

( * ) Notice: Subject to any disclaimer, the term of this patent is extended or adjusted under 35 U.S.C. 154(b) by 557 days.

(21) Appl. No.: 10/140,599

(22) Filed: May 7, 2002

(65) Prior Publication Data

US 2002/0175933 A1    Nov. 28, 2002

(30) Foreign Application Priority Data

May 8, 2001    (FI)    .................................. 20010958

(51) Int. Cl.
*G06F 3/048*    (2006.01)
*G06F 3/16*    (2006.01)

(52) U.S. Cl. ...................... 715/727; 715/803; 715/978; 715/764

(58) Field of Classification Search ................ 715/762, 715/716, 727, 728, 729, 978, 781, 803, 864, 715/865, 778, 700, 717, 767, 764, 802, 848, 715/849, 863; 381/1, 17, 24; 340/825.19, 340/692, 825.24, 825.25, 384.1, 384.5, 384.7
See application file for complete search history.

(56) References Cited

U.S. PATENT DOCUMENTS

| | | | | |
|---|---|---|---|---|
| 5,223,828 A * | 6/1993 | McKiel, Jr. | ............. | 340/825.19 |
| 5,287,102 A * | 2/1994 | McKiel, Jr. | ............. | 340/825.19 |
| 5,374,924 A * | 12/1994 | McKiel, Jr. | ............. | 340/825.19 |
| 5,533,182 A * | 7/1996 | Bates et al. | .................. | 715/727 |
| 5,680,152 A | 10/1997 | Bricklin | ....................... | 345/119 |
| 5,798,922 A * | 8/1998 | Wood et al. | ............... | 381/17 X |
| 6,081,266 A * | 6/2000 | Sciammarella | ............... | 715/727 |
| 6,184,876 B1 * | 2/2001 | Miller | ..................... | 715/727 X |
| 6,252,594 B1 * | 6/2001 | Xia et al. | ................ | 715/978 X |
| 6,297,818 B1 * | 10/2001 | Ulrich et al. | ............ | 715/764 X |
| 6,321,158 B1 * | 11/2001 | DeLorme et al. | ........... | 701/201 |
| 6,728,675 B1 * | 4/2004 | Maddalozzo et al. | ... | 715/716 X |

FOREIGN PATENT DOCUMENTS

| | | |
|---|---|---|
| DE | 19755863 A1 | 6/1999 |
| DE | 19917820 A1 | 11/2000 |
| GB | 2354364 A | 3/2001 |

OTHER PUBLICATIONS

Paul McFedries, The Complete idiot's Guide to Windows 95, 1997, Ronland Elgey, edition 2, 102-103.*
IBM Technical Disclosure Bulletin, "Audio User Interface System", vol. 39, No. 3, 1996.

* cited by examiner

*Primary Examiner*—Raymond J. Bayerl
(74) *Attorney, Agent, or Firm*—Perman & Green, LLP

(57) ABSTRACT

The invention relates to a method and arrangement for expanding a desktop. Especially the invention relates to a method and arrangement for expanding a desktop virtually. The objects of the invention are fulfilled by relating an audible sound to the application, window or other user interface element as it is shifted out of the display. The sound related to the user interface element may also be characteristic for the element it is related to. In addition, the element can be located by only listening to the sound related to the element.

34 Claims, 4 Drawing Sheets

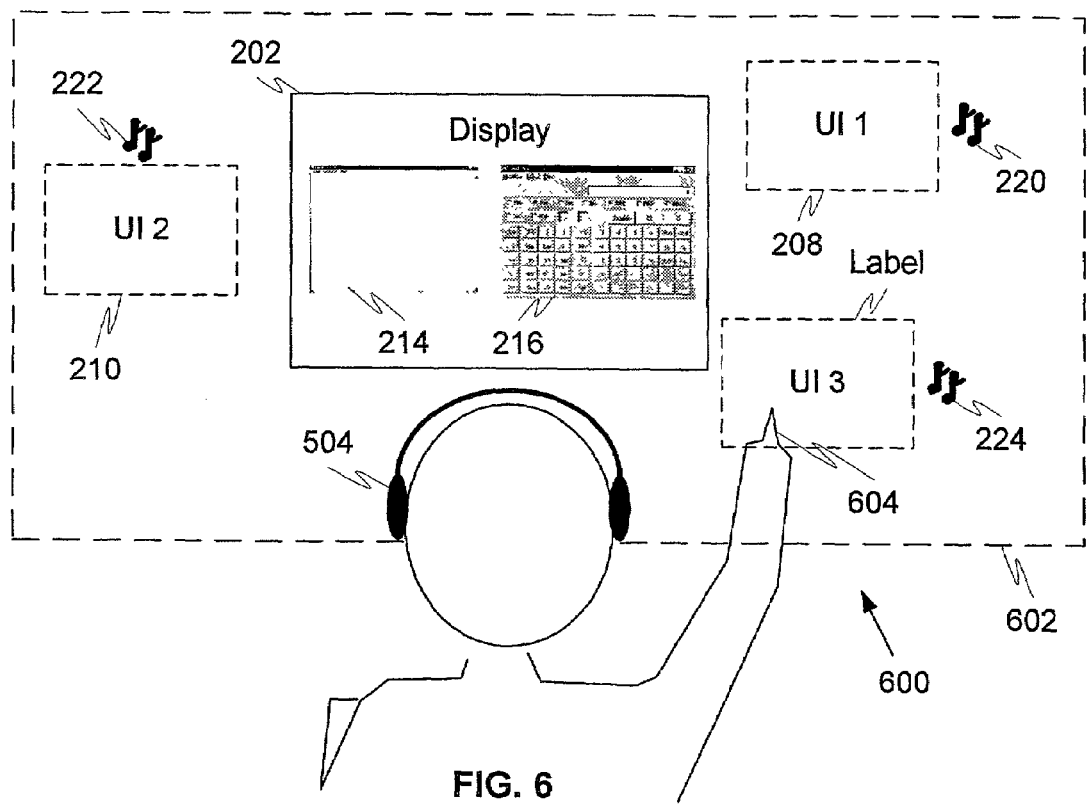
FIG. 6
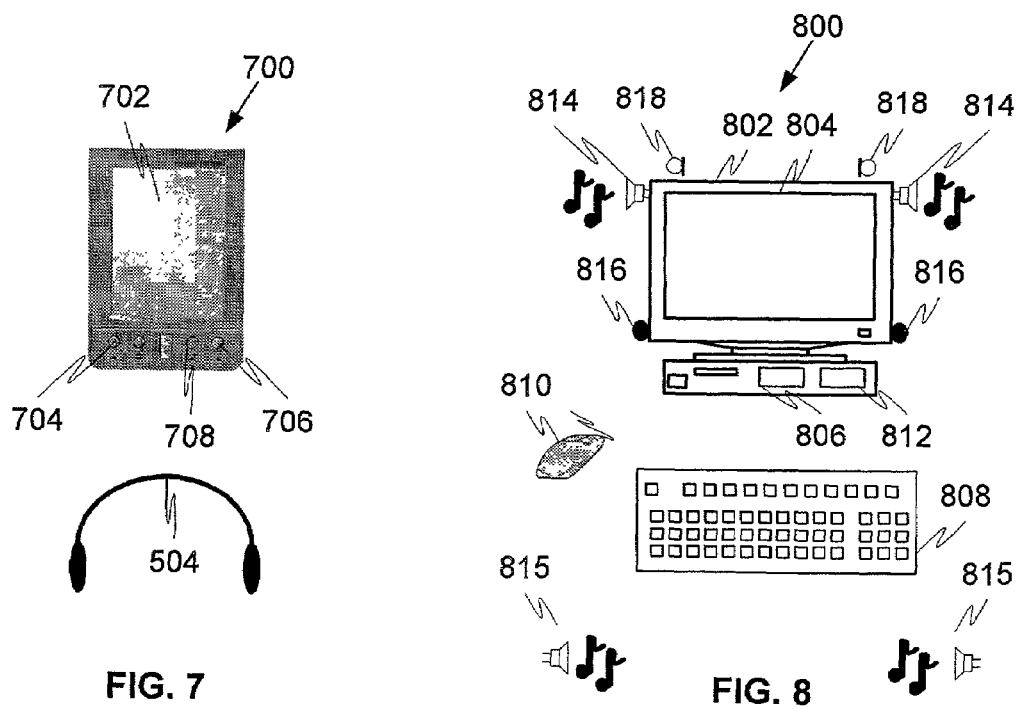
FIG. 7
FIG. 8

METHOD AND ARRANGEMENT FOR PROVIDING AN EXPANDED DESKTOP

TECHNICAL FIELD OF THE INVENTION

The invention relates to a method and arrangement for expanding a desktop. Especially the invention relates to a method and an arrangement for providing a virtually expanded desktop. In this patent application "desktop" broadly means any user interface where objects, such as user interface elements, are illustrated for the user, and where the user is able to control functions that are related to the objects.

BACKGROUND OF THE INVENTION

The use of computers, PDAs (Personal Digital Assistant), GPSs (Global Positioning System), mobile terminals and other kinds of data processing systems has increased strongly in recent years. At the same time the size of these systems and devices has become smaller, whereupon there has arisen some problems with the size of the screens and displays of these apparatus. Visual acuity of human being is quite limited so that individual can't see small objects clearly and thus the size of the displays must be kept moderately big. There are, however, some other problems with small displays and also with big displays, when a large number of application windows are operated parallel, because there is not enough space in the display for showing all operated applications, windows or other user interface elements simultaneously.

There are several prior art solutions for solving the problems mentioned above, like a taskbar for example in Microsoft Windows™ operating systems and different kinds of task lists. There are also so called virtual desktops, which can be larger than the physical screen, whereupon user can switch between the different user interface elements, applications or windows by scrolling the virtual desktop in horizontal and vertical directions.

A solution is also known where windows can be dragged outside of the screen so that a part of them remains on the display. In addition, there is a solution where the windows and other user interface elements can be stacked on top of each other, the desired window or other element can be selected by switching between the windows by using, for example, some button combination.

However, there are certain disadvantages and problems related to the prior art solutions that were described above. For example, in solutions where users are allowed to have a large number of windows, applications and other user interface elements on top of each other, the switching between e.g. the windows can be carried out by using buttons and button combinations (such as alt+tab in Microsoft Windows™ operating systems) that requires much knowledge about how the operating systems work. With many windows stacked, it is also difficult to know how many active windows and applications there actually are, what they contain, what their purpose is and what is the state of the applications.

Furthermore, in applications, which contain larger virtual desktop than the physical screen or display the scrolling the desktop is typically slow and tedious and if the virtual desktop is much larger than the physical screen (which can be true with small screens), it becomes very difficult to remember the location of a window and to find it. In systems, which allow the shifting the windows so that part of the window is still on the screen, the screen space or display easily becomes confused.

There are also some arrangements with a task list that shows all the active windows, applications and other user interface elements. This kind of arrangements require a way to activate the task list, and again the list of active tasks can be so long that it requires scrolling.

SUMMARY OF THE INVENTION

The object of the invention is to achieve improvements related to the aforementioned disadvantages and problems of the prior art. The aim of the invention is also to expand the desktop virtually so that user can easily know the windows, applications and other user interface elements and the location of them in the space of the desktop. It is also essential for the invention to make possible that user can activate the window or other element that he or she wants to be activated by easy, fast and natural way.

The objects of the invention are fulfilled by a method and an arrangement that provides the use of a sound related to applications, windows and other user interface elements so that a user gets information on their location by listening the sound of the applications, windows and other user interface elements. The spoken command, speech, gesture and motion recognition may also be utilized to carry out the requirements of the invention.

A method according to the invention for providing an expanded desktop illustrating at least one user interface element is characterized in that said user interface element is located outside a display area of the desktop, a determined sound is related to said user interface element, and said at least one user interface element is located on the basis of said determined sound related to the user interface element.

An arrangement according to the invention for providing an expanded desktop illustrating at least one user interface element is characterized in that the arrangement comprises means for providing the user interface element outside the display area of the desktop, and means for providing a determined sound related to the user interface element for locating the user interface element on the basis of said determined sound.

Preferred embodiments of the invention are described in the dependent claims.

The present invention offers easy, fast, and natural way to expand the desktop because of the link between spatial sound and desktop space metaphor. The method according to invention can be applied for example in PDAs, desktop and portable computers and devices, mobile stations, GPSs and in any kind of data processing systems with suitable operating system, display and controlling means. The method according to invention can be applied especially in devices with a small display. The method is advantageously applied in systems, which allow a possibility to operate several applications, windows or other user interface elements simultaneously.

In addition, the method of the invention enables a user to operate one window or application and shift the other elements out of the display so that the user still knows the location of the shifted elements. The method also offers an easy way for a user to know the state of the shifted elements and to bring the shifted element that is needed back to the display.

In this text following terms are used in following meanings:

"Application" is any kind of program or element, which can be executed in the data processing system and shifted or dragged out of display. In addition an application is a user interface element to which a sound can be attached or related according to the invention.

"Desktop" is an area where the applications, windows and other user interface elements are. Virtual desktop can be larger than the display or the visual area of the desktop so that a part of the virtual desktop is out of display. Virtual desktop is typically 2D-desktop, but it can be also 3D-desktop when there can be windows or other elements also in three dimensions as in horizontal, vertical and depth directions.

"Display" is a part of the data processing system where the user can see the applications, windows and other user interface elements. Display can be e.g. a typical monitor or screen of a desktop computer, LED-display (Light Emitting Diode) or LC-display (Liquid Crystal Display). Alternatively, the display can be a touch sensitive display or screen or also a projector type screen.

"Pointing device" can be user's arm or finger supplied with suitable motions and location or gesture recognition means. Pointing device can also be a specific stick, such as a joystick, a mouse or even key, such as arrow keys. Pointing device can also be for example any kind of pointer, such as stick or user's finger by which user can point or touch the touch sensitive screen or laser pointer with a light sensitive display or screen.

"Sound" is any kind of sound related to a window, application or other user interface element so that the user can know the location of the element by only listening the sound. The sound can be for example a mono or stereo sound or 3D-processed sound.

"User interface element" (UI element) or desktop element is any kind of object or element in the display. User interface element is a common term for executable applications and windows, which can be indicated by some icons or other signs on the display. User interface element can be for example a window of some program as an email program, web browser, ftp-downloading program or program for image processing. The outward appearance or type of the element depends on the used operating system. In addition the user interface element is that kind of element that a sound can be related to it and that the element can be also shifted or dragged to/from the display according to the invention.

"Window" is any kind of program or element, which can be executed in the data processing system and shifted or dragged out of display. In addition an application is an element to which a sound can be attached or related according to the invention.

In the method according to the invention the user can run a program or application such as download a large file in his or her web browser or do some other time-consuming task and to put the active window away, for example, for multitasking with several applications. In any case, even if the display is small, it is avoided to be cluttering.

User can then continue on another task, but the active window should first be dragged elsewhere, away from active display area. If there is a virtual desktop, such as in PCs (Personal Computer), where the desktop can be larger than the display are, user can drag the window out of display. The windows, applications and other user interface elements can be dragged out of display for example by using a pointing device, such as a mouse, arrow key, software created button, gesture or motion recognition system or by using a spoken command. Optimally the pointing device can be a 3D-mouse or some other hand-held device where the user can first point towards the window, then press some key or move his fingers to indicate the grabbing action, then move his hand somewhere to drag the window there. This can be implemented in a hand-held device for example by utilizing motion sensors and some button to mimic the grabbing action.

According to the invention a sound is related to the window whereupon the window starts making a sound after or during it is moved away from the screen. The sound can be continuous, periodic or it can be made audible only when needed. In addition, the sound can be any kind of sound that enables the user to hear where the window is when it is not on the screen. This sound can be something that the user gets very easily used to, such as pink noise or a sound selected by the user so that the sound won't get disturbing. However, the sound is preferably different for each window or other user interface element so that they can be differentiated from each other by only listening to them. This way the user can remember both the sound each window makes and the location of the window out of display.

When the user has dragged the window to the desired position, the user can continue working on another application on the display. At this stage the dragged window can either keep making sound in order to all time to tell where it is, or it can be made silent in order to be activated later. Activation of the sound can be done either by user or automatically when window finishes doing its background task.

After the program has finished what it was doing or it needs some further activities from the user, e.g. when prompting a file name etc., it can make another sound, which preferably resembles the original sound, for indicating that it is ready and it can now be dragged back to the desktop again. Another indication is that the "ready" sound is obviously something longer than just a "kling" and it is brought towards the user in 3D-space. In this case the "ready" sound can also be the same as the original dragging sound. In other words, the window automatically approaches the user to offer its services again. After coming closer to the user it can also be brought on the display automatically.

Now the user can, by using the pointing device, point towards the window and drag it back to the desktop, if the window didn't appear automatically. It can also be decided that pointing only is enough of an indication for bringing the window back. This can be advantageous feature e.g. in systems or arrangements where the only pointing devices are for example arrow keys and when dragging is a bit difficult. In this case, for example, if the window to be activated is brought to the left of the user, pressing left arrow may activate the window.

The situation above describes a case where there is a background task, which obviously can also be continuous, such as when an email application window keeps quiet for as long as nothing happens, and the background task monitors incoming emails. However, not every window has such tasks. Sometimes the user just wants to drag a window away from the screen and return to it later on, as in multitasking situations. Then there has to be a way to find the windows in the 3D-audio space again.

One way to achieve this according to the invention is that all the windows keep making continuous sound, each characteristic for its own window, as mentioned before. This may, however, increase listening fatigue. So another solution according a preferred embodiment of the invention is to activate the sound only when needed. This can be done for example by the pointing activity when there are motion or location sensors in the device and when the user can use them for pointing in any direction. User can sweeps for example his arm in 3D-space and if he is pointing towards a window in that space, the pointed window makes a sound.

Yet another embodiment of the invention is to have some other means for activating the window's sound. For example, the device may contain a hardware button or some software created button in the desktop that activates the windows. When the user presses this button all the windows start making their own sounds either one by one or all at once, which way is ever preferred.

A further embodiment of the invention is to offer a spoken command with which the user can interact with any window or other user interface element. At simplest the user can say for example "email" and the email window starts making its own sound, coming from the point in 3D-virtual space where it is located. The application can also be of that kind that it offers a way to interact using sound only, such as an email reader application, when the user can also utilize it without dragging it back to the screen. For example, when an email comes the window indicates this with sound as described above. In this case the user may command the application e.g. to read out the email by using synthesized speech either by using a spoken command as "read" or using some other traditional method such as a button, menu selection or soft created button. The synthesized speech can also come from the point in 3D-space where the window is located. If it is decided that a window with a request for user interacting is brought towards the user in 3D-space, it can at this stage start reading the email and automatically go back to the same position where the user dragged it in the first place.

BRIEF DESCRIPTION OF THE DRAWINGS

Next the invention will be described in greater detail with reference to exemplary embodiments in accordance with the accompanying drawings, in which FIG. 6 illustrates an exemplary method to activate the window or bring the window back to the display according to an advantageous embodiment of the invention, FIG. 7 illustrates an exemplary data processing system where the invention can be applied, and FIG. 8 illustrates another exemplary data processing system where the invention can be applied.

DETAILED DESCRIPTION

Figure 1:
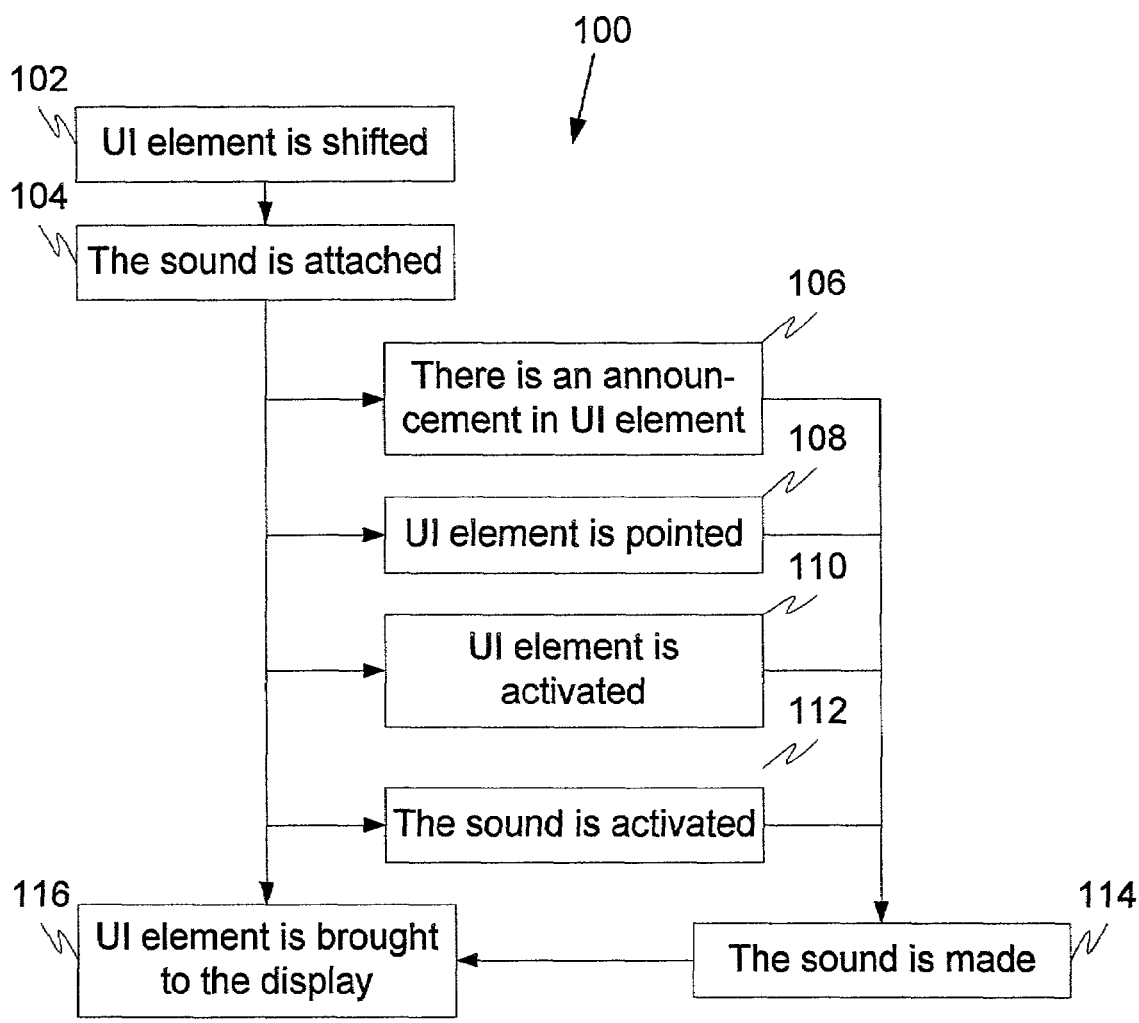
FIG. 1 illustrates a flow chart of a method according to an advantageous embodiment of the invention.

FIG. 1 illustrates a flow chart of a method 100 according to an advantageous embodiment of the invention where a window, application or other user interface element (UI element) is shifted in step 102 away from an active display area or for example out of the visual field of the desktop. The windows or other elements can be shifted or dragged for example to the left, right, up or down. In addition in one embodiment of the invention the windows and other elements can be shifted also in depth direction, in other words in direction perpendicular to the surface of the display or screen.

In step 104 an audible and individual sound is attached to the window so that the window can be differentiated from other sounding windows by only listening the sounds the windows are making. The sound can be attached to the window for example after or during the shifting and the sound can be either continuous, periodical or it can be activated and deactivated by different ways such as pressing a button or key, by pointing the window or by a gesture or spoken command. According to one embodiment the sound is made in step 114 immediately after the step 104 where the sound is attached to the window.

The sound can be any kind of audible sound like a pink noise or a bit more complex sound. The sound can be some non-disturbing sound and for example even a simple song or speech. The sound the window makes is typically a stereo sound or 3D-prosessed so that it is possible for the user to hear from which direction on the desktop or in 3D-space the sound comes from. In other words, if the user drags the window to the left, the sound also moves to the left. The further to left the user drags the window, the further from the left comes also the sound. At some point, for example, when dragged enough to the left, no part of the window is visible on the display anymore. At this stage it is only the sound that tells the user the location of the window. It can be also arranged so that there are special kinds of sound in the each direction on the desktop whereupon the window in the left part can make different kind of sound than the window in the other part, as for example in the right part on the desktop.

The sound can be attached to the window automatically or alternatively the user can decide what kind of sound is used and to what window or element it will be attached. In this case it comes much easier for the user to associate the sound with some window or other element when the sound is always the same in the same window. There can be for example a certain sound, speech, voice or song in email application and other sound for another window or application. However, the sound should be of the kind that the desired window is differentiated from other windows only by the sound it makes.

The shifted window can be quiet for example as long as there is a happen or announcement in the window like in step 106. There can be a task or some running program in the window, and when it is ready or it needs some further activities from the user, the window can make a sound in step 114.

The window out of display can make the sound in step 114 also as it is pointed by a pointing device as described in step 108. The pointing device can be for example a mouse or key such as an arrow key. The pointing device can be also some kind of gesture recognition device or motion or location sensor for observing movements for example of a control stick. The user can for example seek the windows out of desktop by move the mouse or other devices along the perimeter of the display and when the mouse or device, such as a stick, points towards the window, the window can make a sound indicating that it is pointed.

According to the one embodiment of the invention the user can also move his arm or finger and point in any direction of the display. When the user points toward the window out of the display with his arm or finger, the pointed window can make a sound. In this embodiment there can be a required motion and/or location sensors in the user's finger or arm or alternatively the sensors can be placed also in user's data processing systems to detect the motion and location of the user's arm or other pointing device. Motion and location of the user's finger and arm can be monitored also by using some other purposed method such as camera.

The window can also start or stop making a sound as the window is activated or deactivated using some command or device as in step 110. The window or all windows or other elements can be activated or deactivated for example by pressing a button, clicking a mouse button, clicking a software created button or some other ways. The windows can be activated or deactivated also by spoken command, which command can be associated to desired window. The spoken command can be for example "email" whereupon email application starts or stops making its sound or alternatively it appears to the displays. The window can be activated or deactivated also by gesture recognition method and means described in this text. The activation of the window can be done for example in situation when the user wants to know the location or state of a window or windows and conceivably bring the window back to the display. According to the invention the activated window starts making its own sound so that user can make out the position of the window for example in 3D-space or get some knowledge of the state of the sounding window.

According to one embodiment of the invention also the sound or sounds attached to the window or windows can be activated or closed in step 112 by using some command or device. The commands and devices for controlling the sounds are essentially the same described elsewhere in this text such as pressing a key, soft created button, mouse click, gesture or spoken command and means for carry out that action.

In step 116 the desired window can be brought to the display. The bringing can be made for example by pointing the sounding window by some previously mentioned pointing device when the sound of the sounding window can change or become louder indicating that it is pointed or activated and finally by pressing for example a key, mouse button or some other means when the desired window appears or pops up to the display. The sounding window can be brought to the display also by some other method, such as pressing suitable button or key for example in certain time. According to an embodiment of the invention the window can also appear automatically to the display when the execution task in it is ready or finished or there is an announcement in the window.

Figure 2:
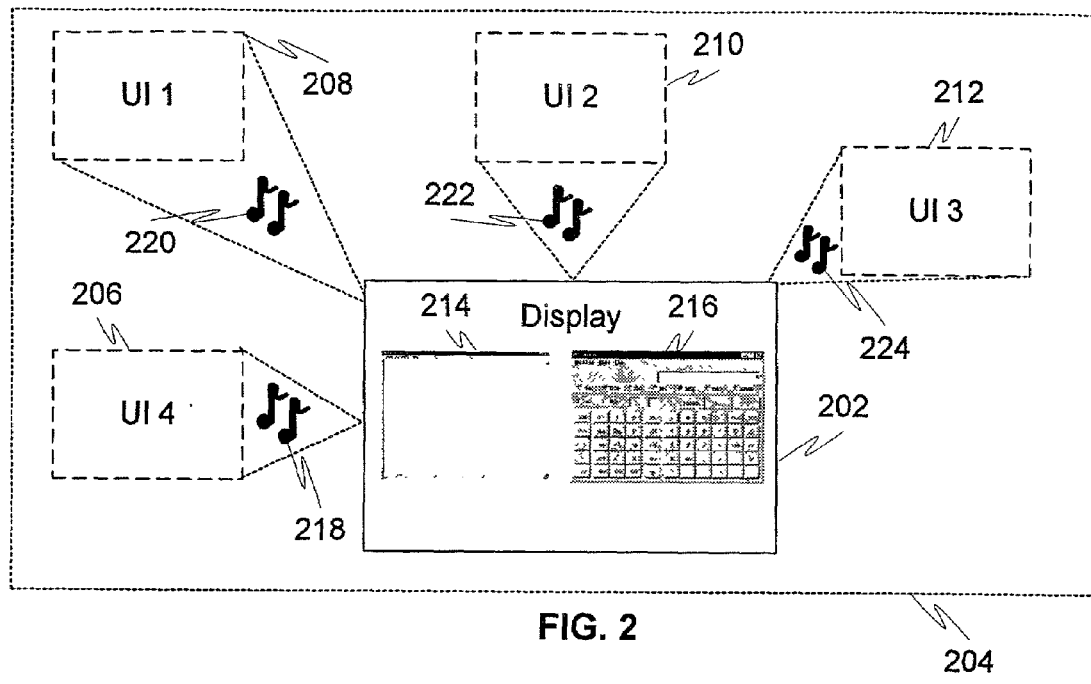
FIG. 2 illustrates an exemplary expanded virtual desktop according to an advantageous embodiment of the invention.

FIG. 2 illustrates an exemplary desktop or display 202 according to an advantageous embodiment of the invention where the desktop 202 has expanded to virtual desktop 204 by using the sound, as 3D-sound, according to the invention. In this case the user can see only the restricted area or display area 202 on the screen of his data processing system. The shifted windows, applications or other user interface elements (UI) 206, 208, 210, 212 have dragged or shifted by some way to the virtual desktop 204 out of the display 202 so that each of the elements are making own characteristic sound 218, 220, 222, 224. The display 202 can still contain one or more window 214, 216. In addition it must be taken into account that size of the virtual desktop 204 is not limited or restricted by the original desktop 202.

The windows 206, 208, 210, 212 can make their sound 218, 220, 222, 224 for example continuously and simultaneously when the user can hear the sound and recognize the location of all windows at once. Alternatively the windows can make their sound also periodically or one by one when the user can perceive location, state or other features of each of different windows easier. In addition according to an advantageous embodiment of the invention the window can make its sound when there is an announcement in it or the window is activated by some way described in this text.

However, it is common for all the embodiments described above that the sound attached to the window seems to come from the point where the window is located in the display or virtual desktop 204. In other words for example the window 206 on the left side of the display 202 makes its sound 218 so that the sound 218 seems to come from left and the windows 208 makes its sound 220 so that its sound 220 seems to come from the upper left corner of the display 202. The window 212 on the upper right corner makes its sound 224 so that its sound 224 seems to come from the upper right corner of the display 202, but also closer than the sound 220 of the window 208. In addition the shifted or dragged element can be behind of the windows on the display whereupon the sound of the element behind the windows seems to come from behind the desktop or display.

Figure 3:
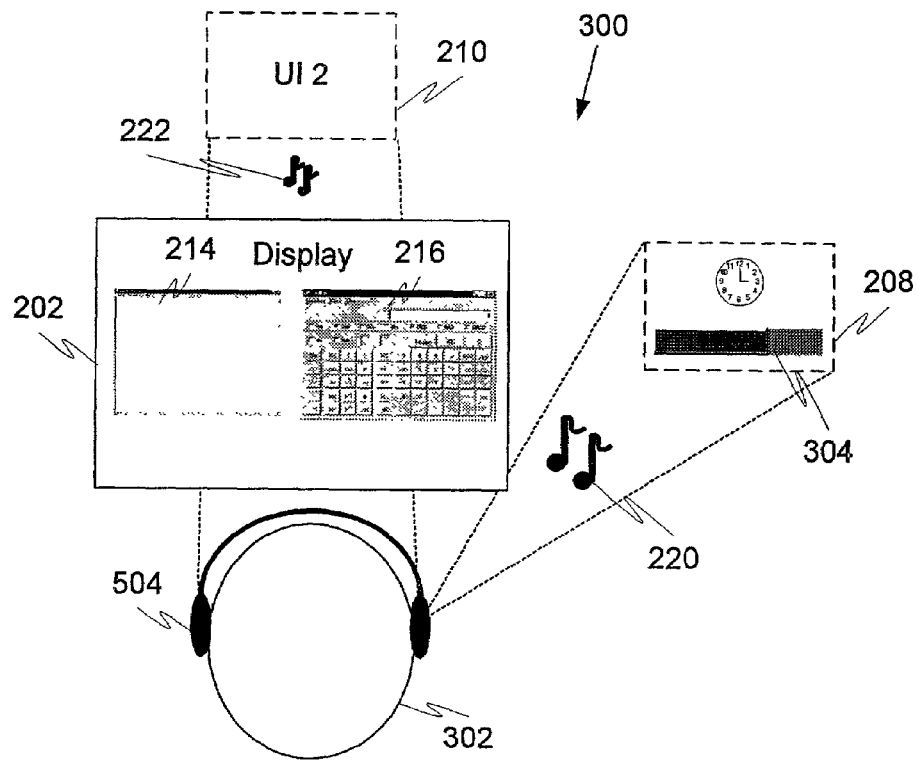
FIG. 3 illustrates an exemplary method to indicate the location of the element out of display according to an advantageous embodiment of the invention.

FIG. 3 illustrates an exemplary method 300 to indicate the location of the element out of the display according to an advantageous embodiment of the invention. The user 302 can operate an active applications or windows 214, 216 on the display 202 and at the same time know the location or other features of the windows 208, 210 out of the display 202 by only listening the sound 220, 222 the windows 208, 210 are making. The window 208 is arranged to make its own sound 220 so that the sound 220 seems to come from the right side of the user 302 or display 202 and the window 210 is arranged to make its own sound 222 so that the sound 222 seems to come from the point above the display 202. The sounds 220, 222 can be heard for example by at least two, typically 2–6 speakers, or stereo headphones 504.

The window can make a sound also so that the sound indicates the state of the executed task. The level of the sound can for example become higher when the executed task approaches the end or the task will be ready soon. There can be for example a downloading or other time consuming task 304 in the window 208 when the window 208 is making its own sound to indicate the location of the window 208 and at the same time indicate the state of the downloading or other executing task 304. At the same time the window 210 can be quiet or make continuous sound or it can monitor incoming mails and make a sound when there is some announcement in it or it is activated or pointed by the user.

Figure 4:
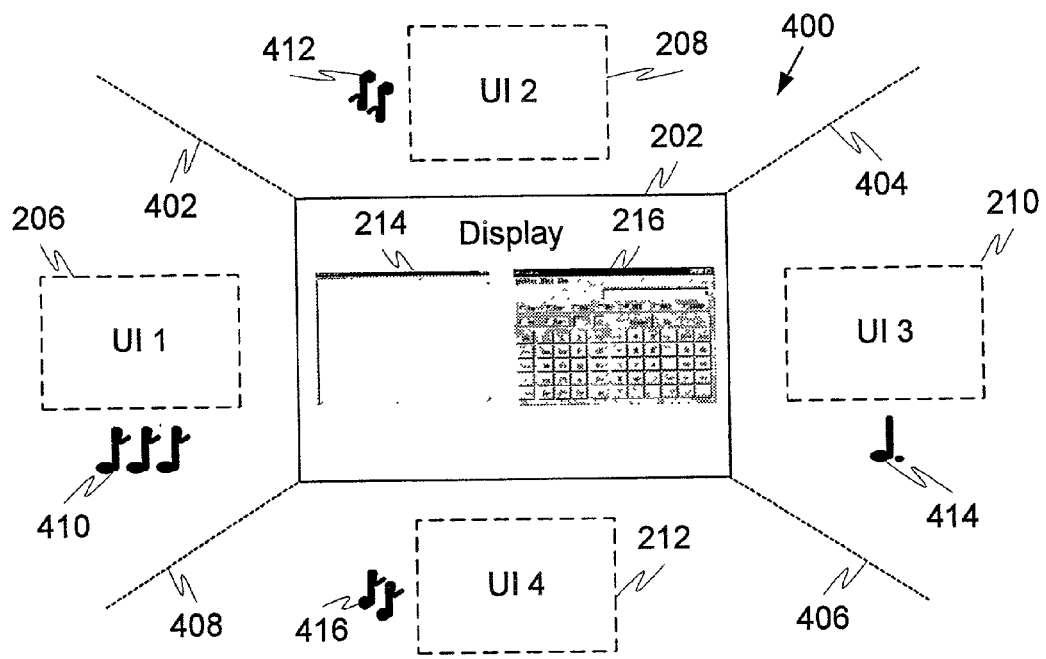
FIG. 4 illustrates another exemplary expanded virtual desktop according to an advantageous embodiment of the invention.

FIG. 4 illustrates an exemplary arrangement and method 400 according to an advantageous embodiment of the invention where the expanded virtual desktop has been divided in four virtual parts or sectors around the display 202. In this case the shifted window located in a specific part of the virtual desktop can make the sound characteristic to the part of the desktop. The virtual desktop can be divided for example like in FIG. 4 when there is an upper part between the lines 402 and 404, a rightward part between the lines 404 and 406, lower part between the line 406 and 408 and leftward part between the lines 408 and 402 respectively. Now the window can be shifted into the any part of the divided virtual desktop whereupon the sound related to the window is specific to the part where the window is and the user can know at least the rough location of the window by only listening the sound related to the location of the window.

For example, the window 208 being in the upper part can make the sound 412 specific for the upper part of the virtual desktop. Similarly the window 210 can make the sound 414 indicating that the window 210 is in the rightward part of the desktop, the window 212 can make the sound 416 related to the lower part and the window 206 can make the sound 410 related to the leftward part of the desktop. It is also essential to realise that the virtual desktop can be divided arbitrarily, automatically or alternatively by the user so that there can be numbers of different parts and actually so that the size or shape of different parts of the virtual desktop are not necessarily identical.

The sounds 410, 412, 414, 416 can be chosen by automatically or by the user and the sounds are typically that kinds of sounds that user can easily and naturally remember and associate the sound with the specific part of the divided desktop. The sound 412 in the upper part can be for example higher than the sound 416 in the lower part and the sound 410 in the leftward part can be consist for example of many short notes whereas the sound in the rightward part can be a long sound. A person skilled in the art knows that there are naturally plenty of different alternatives to choose the sounds and it is not possible to describe than a few as an example in this description.

Figure 5:
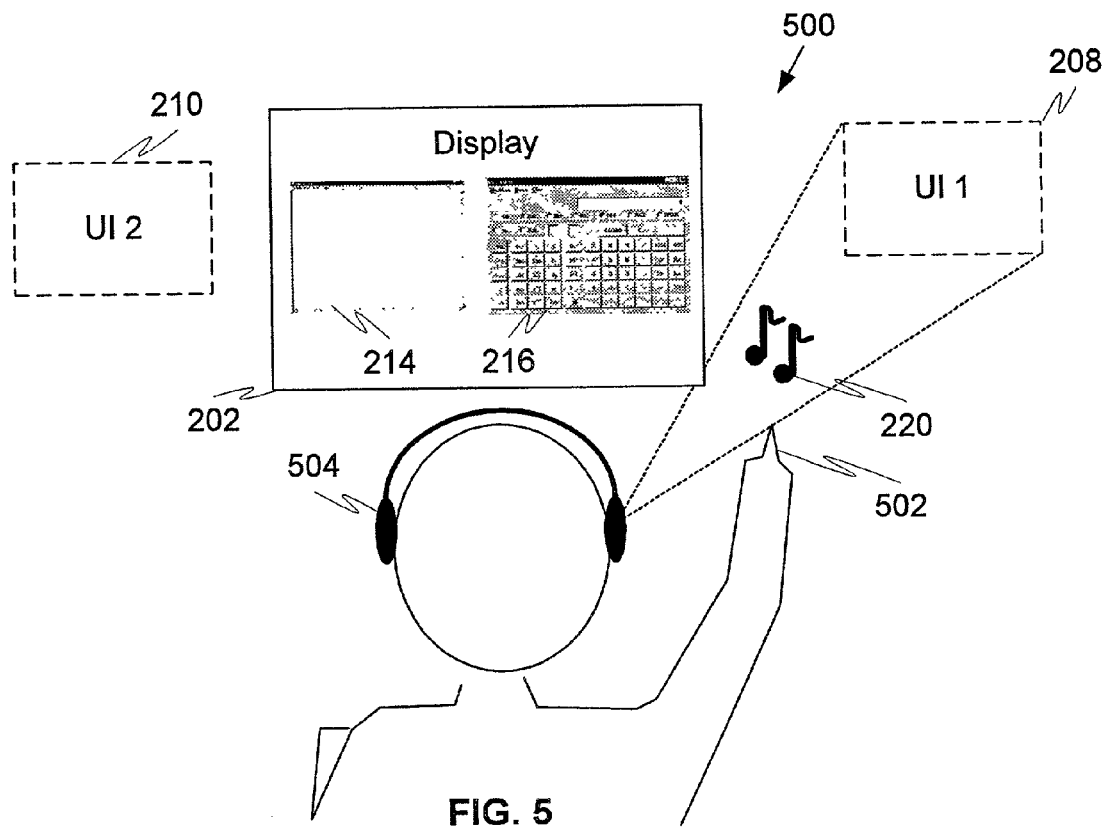
FIG. 5 illustrates an exemplary method to activate the window to make a sound or bring the window back to the display according to an advantageous embodiment of the invention.

FIG. 5 illustrates an exemplary method 500 to activate or deactivate the window 208, 210 to make a sound 220 or bring the window back to the display or shift the window elsewhere according to an advantageous embodiment of the invention. According to the invention a user may have a pointing device by which he can point in any direction of the display 202. The pointing device can be for example a mouse, 3D-mouse, laser pointer, arrow key or user's arm or finger 502 or special stick for this purpose. In addition there can be sensors or recognition means such as a gesture, location and/or motion recognition means and sensors, which observe the location and motion of the user's arm or other pointing device.

According to the invention the windows 208, 210 can make sound 220, as continuous sound, whereupon a user can deactivate the sound 220 by pointing the sounding window 208 by the pointing device described in this text. The deactivating and activating of the sound can be made also by a gesture or spoken command or by pressing a button, key or by a mouse click.

According to one advantageous embodiment of the invention the user can point towards any window such as towards the window 208, whereupon the window 208 can make the sound 220 indicating for example its location, state and in general that it is pointed. When the user points towards the window 208, the window 208 advantageously makes its own sound 220 whereupon user can bring the window 208 back to the display 202 for example by a mouse click, by pressing a button or key or by a gesture or spoken command. A gesture command can be for example such that the user points towards the window 208 by his arm or finger 502 and mimic the catching and dragging the window 208 by moving his finger and/or arm towards the display area 202.

The windows can be shifted or dragged also in a virtual desktop area, in other words in area out of display. The user can activate the window for example by pointing or pressing a button and then drag the window to the point he wants. The user can imagine the location or movements of the window 208 on the virtual display area only based on the sound 220 the window 208 makes and where the sound 220 seems to move.

There can also be numbers of windows in the virtual desktop so that they are quiet as the window 210. This kind of window 210 can execute its task and inform the user by a sound when the execution of the task is finished or there is an announcement in the window. The user can get the windows also to make their sound by pointing them or by a command such as pressing button, key or by gesture or spoken command.

FIG. 6 illustrates another exemplary method and arrangement 600 to activate or deactivate the window 208, 210 212 to make a sound 220, 222, 224 or shift the window to or from the display or shift the window in the virtual desktop. This can be achieved according to one embodiment of the invention so that there are provided means for providing a touch sensitive screen 602 or display 202 or alternatively at least one touch sensitive area on the screen or display to allow the user to touch the screen 602, display 202 or area to activate or deactivate the sound of the window, shift the window for example by dragging the window out of display 202 or bringing it back to the display 202.

The user can touch the screen 602 in a point based on the sound 220, 222, 224 that the desired application or window 208, 210, 212 appears to the display 202. For example if the sound 220 of the desired window 208 seems to come from a point located in the right side of the display 202, the user can touch the display 202 in right side or touch the point where the sound seems to come. In addition the user can shift the window out of display 202 by pointing or touching the desired point on the touch sensitive screen 602.

The touch sensitive screen 602 can be also larger than the display 202, whereas the sound 224 related to the window 212 can seems to come from the point where the window is in the virtual desktop outside the display. Now the user can touch the touch sensitive screen 602 in the point where the sound 224 seems to come for example for deactivating the sound 224 or for bringing the window back to the display 202. The user can touch the touch sensitive screen 602 for example by pointing device 604, such as his finger, pen, or special stick or pointer provided for this purpose.

FIG. 7 illustrates an exemplary data processing system 700 where the invention can be applied. The data processing system can be for example a mobile device such as a mobile station, PDA (Personal Digital Assistant) 700 or GPS (Global Positioning System), which comprises a display 702, memory and processor for execute at least one application or program. The memory can be for example RAM (Random Access Memory) and/or ROM (Read Only memory) type memory. The display 702 can be e.g. a touch sensitive display.

The data processing system 700 comprises also the means for providing the virtual desktop, means 704, 706 for control the device or process such as the means for shifting or dragging the windows or applications out of display or bringing them back to the display. The means 704, 706 for control the device can be for example buttons, keys, joystick, mouse, 3D-mouse, gesture and motion recognition means or spoken command recognition means such as a microphone. In addition the data processing system 700 comprises means for make the stereo or 3D-processed sound, such as a sound card with at least two speakers or stereo headphones 504 and at least one microphone 708.

FIG. 8 illustrates another exemplary data processing system 800, where the invention can be applied. The data processing system 800 can be for example a computer, such as a desktop, portable or personal computer or workstation. The data processing system 800 according to an embodiment the invention comprises a monitor or screen 802 and display 804, a processor 806 and suitable memory unit 806, such as RAM or ROM type memory and means for providing the virtual desktop or 3D-virtual desktop. The screen or display can be for example a touch sensitive screen or there can be at least a touch sensitive area on the screen 802 or display 804. The data processing system 800 advantageously comprises also means for controlling the device, such as keyboard 808 and mouse 810, and also means for providing a 3D-sound. There can be for example a suitable sound card 812 with front speakers (front left, front right) 814 and possibly two additional back speakers (back left, back right) 815 arranged for providing the 3D-sound. In home theatre systems there may actually be five or six speakers in total for providing the 3D-sound.

In addition the data processing system 800 according the invention may also comprise the means for recognition gestures, motions and spoken commands. The gesture, motion or location recognition means 816 can be for example infrared or infrasound motion or location sensors or they can be carried out by a camera system 816 or by other way for observing the motions and gestures for example of user's arm or fingers or other pointing devices. The system 800 according to the invention typically comprises also at least one microphone 818.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims.

The invention can be applied in various other apparatus in addition to those mentioned. For example, the invention is very suitable for providing a user interface for a digital television. In addition it must be taken in account that window, application or user interface element mentioned in this application can be any kind of program or element, which can be executed or run in computer or in other kinds of data processing systems.

The invention claimed is:

1. A method for providing an expanded virtual desktop that includes at least one user interface element, comprising:
providing at least one area on the expanded virtual desktop that is not visually discernable by the user and that expands outside of all areas visible to a user in a screen;
locating the at least one user interface element outside all visible display areas visible to the user in the screen and within the expanded virtual desktop;
relating a determined sound to said at least one user interface element, and
locating said at least one user interface element in the expanded virtual expanded desktop on the basis of said determined sound related to said at least one user interface element located outside all visible display areas visible to the user in the screen and within the expanded virtual desktop.

2. A method according to claim 1, comprising that said sound related to the at least one user interface element located outside the visible display area is characteristic for the direction of the user interface element in the expanded virtual desktop.

3. A method according to claim 1, comprising that said sound related to the at least one user interface element located outside of the visible display area in a determined part of the expanded virtual desktop is characteristic for this part of the expanded virtual desktop.

4. A method according to claim 1, comprising that said sound related to the at least one user interface element located outside of the visible display area is characteristic for said user interface element.

5. A method according to claim 1, comprising that said sound is continuous.

6. A method according to claim 1, comprising that the determined sound related to the at least one user interface element located outside of the visible display area is provided when there is an announcement in said at least one user interface element.

7. A method according to claim 1, comprising that determined sounds related to at least two of the at least one user interface elements located outside of the visible display area are provided alternately.

8. A method according to claim 1, further comprising providing the determined sound related to the at least one user interface element located outside of the visible display area is started/stopped when the at least one user interface element is pointed to by using a pointing device.

9. A method according to claim 8, comprising that said pointing device is at least one of the following: a mouse, 3D-mouse, arrow key, user's arm, user's finger and joystick.

10. A method according to claim 1, comprising that the determined sound related to the at least one user interface element located outside of the visible display area is activated and deactivated using a command.

11. A method according to claim 10, comprising that said command is at least one of the following: a gesture, pointing and spoken command, mouse click and a pressing of a key and soft created button.

12. A method according to claim 1, comprising that the determined sound is provided relating to the at least one user interface element located outside of the visible display area, wherein said sound is provided as coming from the point in space in the expanded virtual desktop where the at least one user interface element is located.

13. A method according to claim 1, comprising that the at least one user interface element located outside of the visible display area is activated and brought back into the visible display area of the desktop and shifted outside of the visible display area of the desktop by a pointing device.

14. A method according to claim 13, comprising that said pointing device is at least one of the following: a mouse, 3D-mouse, arrow key, user's arm, user's finger and joystick.

15. A method according to claim 1, further comprising that a desired user interface element of the at least one user interface element located outside the visible display area is activated by a determined command if a sound is provided relating to the desired user interface element.

16. A method according to claim 15, comprising that said command is at least one of the following: a gesture, pointing and spoken command, mouse click and a pressing of a key and soft created button.

17. A method according to claim 1, comprising that the at least one user interface element located outside of the visible display area is activated and brought back into the visible display area of the desktop and shifted outside of the visible display area of the desktop by a command.

18. A method according to claim 17, comprising that said command is at least one of the following: a gesture, pointing and spoken command, mouse click and a pressing of a key and soft created button.

19. An arrangement for providing an expanded virtual desktop that includes at least one user interface element, wherein the arrangement comprises:
means for providing at least one area on the expanded virtual desktop that is not visually discernable by the user and expands outside of all areas that are visible to the user in a screen;

means for providing the at least one user interface element outside all visible display areas that are visible to the user in the screen and within the expanded virtual desktop area that is not visually discernable by the user and expanding outside of all areas being visible to the user in the screen; and means for providing a determined sound related to the at least one user interface element so that a localization of the at least one user interface element in the virtual expanned desktop is based on the determined sound related to the at least one user interface element located outside of all visible display areas that are visible to the user in the screen.

20. An arrangement according to claim 19, comprising that, wherein the at least one user interface element is located in a determined location in the expanded virtual desktop, a sound is characteristic for a direction of the location.

21. An arrangement according to claim 19, comprising that the at least one user interface element is located outside the visible display area and in a determined part of the expanded virtual desktop wherein, a sound is characteristic for the determined part of the expanded virtual desktop where the at least one user interface element is located.

22. An arrangement according to claim 19, comprising means for providing a characteristic sound for a specific user interface element of the at least one user interface element located outside of the visible display area.

23. An arrangement according to claim 19, comprising that said arrangement comprises means for providing the determined sound related to the at least one user interface element located outside the visible display area when there is an announcement in the at least one user interface element.

24. An arrangement according to claim 19, comprising that said arrangement comprises means for detecting a pointing device, and means for providing the determined sound related to the at least one user interface element located outside of the visible display area when the at least one user interface element is pointed to by a pointing device.

25. An arrangement according to claim 19, comprising that said arrangement comprises means for detecting a user's arm or finger, and means for providing the determined sound related to the at least one user interface element located outside of the visible display area when the at least one user interface element is pointed by a user's arm or finger.

26. An arrangement according to claim 19, comprising that said arrangement comprises means for detecting a spoken command, and means for providing the determined sound related to the at least one user interface element located outside of the visible display area when the user says a spoken command related to said the at least one user interface element.

27. An arrangement according to claim 19, comprising that said arrangement comprises at least one pointing device.

28. An arrangement according to claim 19, comprising that said arrangement comprises at least one of the following: button, arrow key, software created button, mouse, 3D-mouse, speech recognition means, gesture recognition means and recognition means for observation of motions or location of user's arm or finger to do at least one of the following: activate the at least one user interface element, shift the at least one user interface element, activate a sound of the at least one user interface element, deactivate a sound of the at least one user interface element and point the at least one user interface element wherein, the at least one user interface element is located outside of the visible display area.

29. An arrangement according to claim 19, comprising that said arrangement comprises means for providing a 3D-sound related to the at least one user interface element located outside of the visible display area as coming from a point in virtual space within the expanded virtual desktop where the at least one user interface element is located.

30. An arrangement according to claim 29, comprising that said means for providing the 3D-sound comprise a sound card and stereo headphones or at least two speakers.

31. An arrangement according to claim 19, comprising that said arrangement comprises at least one microphone.

32. An arrangement according to claim 19, comprising that said arrangement comprises a display or screen wherein there is at least one touch sensitive area on the display or screen.

33. A data processing system comprising:
means for providing an expanded virtual desktop that includes at least one user interface element, the expanded virtual desktop comprising at least one area that is not visually discernable by the user and expands outside of all areas visible to the user in a screen;

means for providing the at least one user interface element located outside of all visible display areas that are visible to the user in the screen and within the expanded virtual desktop area that is not visually discernable by the user and expands outside of all areas that are visible to the user in the screen; and means for providing a determined sound related to the at least one user interface element for localization of the at least one user interface element in the virtual expanded desktop based on the determined sound related to the at least one user interface element located outside all visible display areas visible to the user in the screen.

34. A computer-readable medium encoded with a computer program code for providing an expanded virtual desktop expanding outside a visible display area that includes at least one user interface element, the expanded virtual desktop comprising at least one area not being visually discernable by the user and expanding outside of all areas being visible to the user in a screen, the program code causing a computer to execute a method comprising:
locating the at least one user interface element outside all visible display areas being visible to the user in the screen and within the expanded virtual desktop area not being visually discernable by the user and expanding outside of all areas visible to the user in the screen;

relating a determined sound to the at least one user interface element; wherein the at least one user interface element is located in the virtual expanded desktop on the basis of the determined sound related to the at least one user interface element located outside all visible display areas visible to the user in the screen.

* * * * *